No. 656,128. Patented Aug. 14, 1900.
J. D. SPENCE.
METHOD OF REGULATING DYNAMO ELECTRIC MACHINES.
(Application filed Jan. 22, 1900.)
(No Model.)
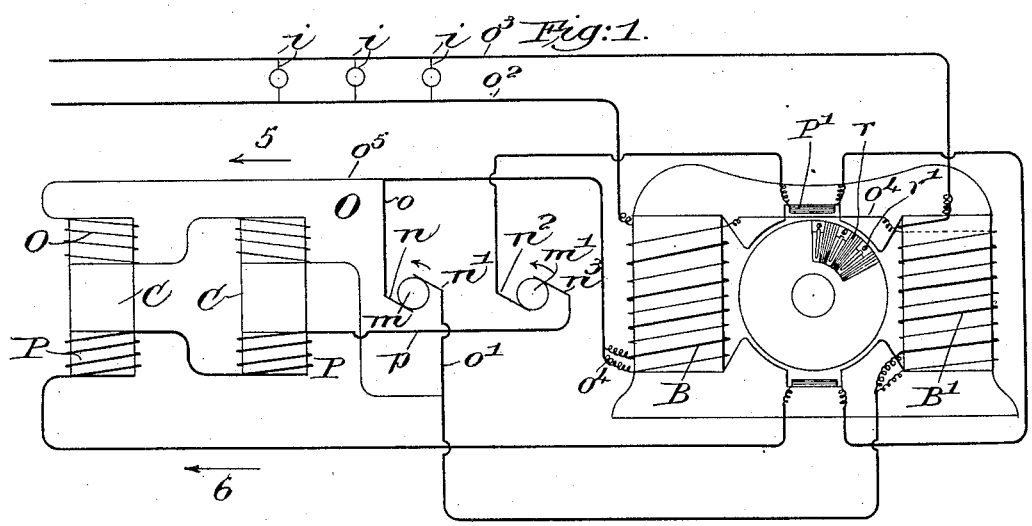
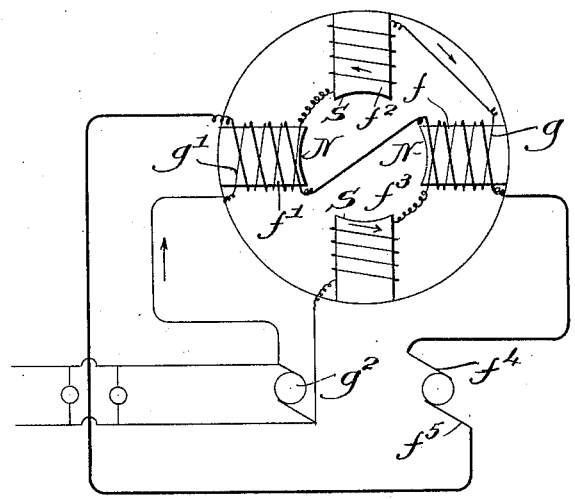
Witnesses,
Edward F. Allen.
Adolf C. Kaiser.
Inventor,
John D. Spence,
By Mosely Gregory.
attys

UNITED STATES PATENT OFFICE.

JOHN D. SPENCE, OF SOMERVILLE, MASSACHUSETTS, ASSIGNOR TO CHARLES L. COTTON, OF DEDHAM, MASSACHUSETTS.

METHOD OF REGULATING DYNAMO-ELECTRIC MACHINES.

SPECIFICATION forming part of Letters Patent No. 656,128, dated August 14, 1900.

Original application filed May 12, 1899, Serial No. 716,494. Divided and this application filed January 22, 1900. Serial No. 2,264. (No model.)

*To all whom it may concern:*

Be it known that I, JOHN D. SPENCE, a citizen of the United States, residing at Somerville, county of Middlesex, State of Massachusetts, have invented an Improvement in Methods of Regulating a Dynamo-Electric Machine, of which the following description, in connection with the accompanying drawings, is a specification, like letters on the drawings representing like parts.

My present invention relates to a method of regulating a dynamo, the present application being a division of my application, Serial No. 716,494, filed in United States Patent Office May 12, 1899, and I hereby refer to my said application for a more detailed description of the preferred apparatus for carrying out my method and for a full explanation of various points which it is unnecessary to refer to herein in more than a general way.

My present invention comprehends a method of regulating a dynamo-electric machine to produce a current of substantially-constant electromotive force; and it consists, generally stated, in varying the strength of the field inversely and in proportion to the variations in speed by means of the inductive influence of a neutralizing-coil.

I have shown two forms of apparatus for carrying out my invention, but do not intend to limit myself thereto, inasmuch as the method may be carried out in various machines, as more fully stated hereinafter.

In the drawings, in which I have illustrated sufficient mechanism in order to make my present invention fully understood, Figure 1 represents, diagrammatically, the several circuits in connection with a magnetic-shunt dynamo. Fig. 2 is a diagram showing modifications thereof.

In my before-mentioned application, to which reference may be had, it will be seen that I may employ a compound-wound dynamo in which the field-coils are indicated at B B', an armature being provided having a main armature-winding $r$ of ordinary form, preferably of fine wire, connected in usual manner with the commutator $m$, and the other coarse winding $r'$, connected in usual manner with an auxiliary commutator $m'$, and the brushes $n$ $n'$, which coöperate with the main commutator $m$, have joined to them the opposite terminals of the main conductors or wires $o$ $o'$, the latter including in series said field-coils B B', said conductors or continuations of the same constituting the line-wires $o^2$ $o^3$ for work, certain translating devices $i$ $i$ being indicated for convenience. A shunt $o^4$ is also shown passing through and constituting a part of the field-coils, as shown, said field having, therefore, what is commonly known as a "compound winding." A second shunt $o^5$ around the brushes $n$ $n'$, and preferably of fine wire, passes in the form of a coil O about each magnetic shunt C, preferably at or near one end of said shunts—as, for instance, the end adjacent the north pole of the field—the direction of winding of the said coils O being such that a current passing through the same in the direction of the arrow 5 tends to magnetize the said shunts with north poles at their upper ends adjacent the north pole of the field.

The brushes $n^2$ $n^3$, coöperating with the auxiliary commutator $m'$, have joined to them the terminals of an auxiliary conductor $p$, which passes in the form of a coil P about each shunt C, preferably at the ends of said shunts opposite the coils O, said auxiliary conductors $p$ also including two preferably-flat auxiliary coils P' P², shown as let into and lying flush with the faces of the field-poles A A', but which, if desired, may be located or arranged in other desired manner adjacent the armature to influence the winding thereof, as will be hereinafter described.

The direction of winding of the coils P is such that a current passing through the same in the direction of arrow 6 tends to magnetize the shunts with south poles at their upper ends adjacent the north pole of the field—that is, the neutralizing-coils P exert a magnetizing effect upon their respective shunts which is in opposition to the magnetizing effect of the coils O, the coils P thus tending to neutralize the effect of the coils O. When the armature is at rest, the several coils are deënergized, and the shunt-cores C, being mere bars of soft iron or equivalent, serve as conduits through which any magnetic flux may flow from one to the other pole of the field instead of being compelled to jump across from one to the other pole through the armature, as would be the case without the said shunts. The field is thus shunted out—i. e., it has no strength so far as its power to induce a current in the armature-winding is concerned, nor can it have any appreciable inductive power so long as the shunts serve as conduits to conduct the magnetism from one pole to the other. There are, however, sufficient lines of force which do jump across from one pole to the other through the armature to generate a slight current in the main armature-winding $r$ and its circuit $o\ o'$ when the armature is set in motion in the usual manner. Immediately as the armature begins to generate a current, however slight, a portion of said current flows through the shunt-coils O in the direction of arrow 5, which current by slightly energizing said shunt-coils tends to set up an independent magnetism of greater or less strength, according to the strength of the current in the shunt-cores C, the magnetism so set up having its north and south poles adjacent the north and south poles of the field. The magnetism set up in the field by the current generated and tending to flow from either of the poles to the other through the shunts is therefore at once met with like magnetism at the ends of the shunt-cores C, and therefore the flow of magnetism through the shunts from one to the other pole is retarded more or less according to the strength of the independent and opposing magnetism set up in the said shunts, all the magnetic flux which cannot flow through the shunts being compelled to jump across through the armature, where it will induce more current. As soon, therefore, as the machine begins to generate any current a portion thereof passes through the shunt-coil O to more or less independently magnetize the shunt-cores C, thereby causing more of the magnetism to jump across through the armature to generate in the latter a yet stronger current to in turn again strengthen the independent magnetism of the shunt-core and strengthen the fields, and so on as the speed of the armature increases until the magnetism of the shunt-cores equals in strength that of the field, when it will completely bar the passage of any magnetism around through the shunt-cores from one to the other pole of the field and will compel the entire magnetic flux to jump across through the armature, thereby bringing the strength of the field up to its maximum and correspondingly bringing the generated current up to its normal electromotive force.

The auxiliary armature-winding $r'$ is preferably so designed that it fails to generate any appreciable current except at speeds above normal. Therefore if the speed of rotation of the armature exceeds the normal the auxiliary armature-winding $r'$ begins at once to generate a current in the auxiliary circuit $p$, flowing in the direction of arrow 6, such current acting, as described, to set up a counter magnetism in the shunts—that is, a magnetism in opposition to and tending to neutralize the magnetism of the said shunts set up by the said shunt-coils O.

The neutralizing power of the auxiliary coils P depends entirely upon the strength of the auxiliary current, the neutralizing effect being greater with a strong current than with a weak current, and as the speed gradually increases above the normal the auxiliary current in the coils P gradually strengthens and to a greater extent neutralizes or lessens the effectiveness of the magnetism set up in the shunts by the coils O. As the magnetism of the shunts set up by the coils O is gradually neutralized or weakened by the opposition of the neutralizing-coils P said shunts will therefore gradually lose their power to hold back the field magnetism and will again act to a greater or less extent as conduits for the passage of the field magnetism from one to the other pole to thereby weaken the inductive power of said field. When the speed of rotation of the armature is increased to such an extent that the auxiliary current in the coils P completely neutralizes the magnetism of the shunts set up by the current in the coils O, then the said shunts will, in effect, have the same influence upon the field as before the machine was started—that is, they will completely shunt the field, depriving the main armature-winding of its power to generate current.

From the above description it will be seen that the auxiliary armature-winding, with its auxiliary coils P on the shunts, does not in any peculiar manner affect the operation of the machine until the speed of rotation rises above normal, but that at once upon increase of speed above normal the auxiliary armature-winding begins to generate a current, which, acting through the auxiliary coils P on the shunts, neutralizes the magnetizing effect of the current in the shunt-coils O, and thereby causes the said shunts to weaken the field in proportion to the increase of speed of rotation of the armature, a gradually-increased speed causing the field to be made gradually weaker, so that the ordinary effect of an increase of speed—viz., the production of a current of higher electromotive force—is in my invention counteracted by the weaker field, which thereby causes the electromotive force to remain practically constant.

By means of my invention, which enables the machine to be run at varying speeds without changing the electromotive force, I am enabled to utilize dynamos for many purposes for which it is impossible to employ machines at the present time as at present constructed. For example, they may be operated from the wheels of a moving railway-train and produce at varying speeds of the train always a uniform electromotive force.

By means of my invention machines may be operated from power plants now in existence and which do not have sufficiently fine or perfect regulation as to speed for properly operating machines as at present constructed.

In Fig. 2 I have shown a construction differing from that in Fig. 1, yet embodying, essentially, the same principle of regulation. In Fig. 2 the machine has four poles $f\,f'\,f^2\,f^3$, each surrounded by a field-coil, said coils being arranged in series, as shown, with the commutator-brushes $f^4\,f^5$ of the main armature-winding. Two of the poles—as, for example, $f$ and $f'$—are provided also with neutralizing-coils $g\,g'$, in circuit with the commutator-brushes of the auxiliary armature-winding. The auxiliary armature-winding at excesses of speed generates a current which acts in the coils $g\,g'$ to more or less neutralize the two field-coils on the poles $f$ and $f'$, thereby more or less demagnetizing said poles and leaving the two poles $f^2$ and $f^3$ of the same polarity at their full strength, which of course weakens the field in the proportion to which the poles $f$ and $f'$ are weakened, for the machine cannot operate with poles of the same polarity. My invention, therefore, is not necessarily limited in its application to machines of any particular class, for by means of slight modifications, which will be apparent to those skilled in the art, my invention is applicable to all forms of generators, whether having two or more poles and of whatever construction.

Having fully described my invention, what I claim, and desire to secure by Letters Patent, is—

1. The herein-described method of regulating dynamo-electric machines having a magnetic shunt, to produce a current of substantially-uniform electromotive force at varying speeds, which consists in varying the strength of the field inversely and in proportion to the variations in speed, by the inductive influence on said magnetic shunt of a neutralizing-current, increasing said current directly as the speed increases, substantially as described.

2. The herein-described method of regulating dynamo-electric machines to produce a current of substantially-uniform electromotive force at varying speeds, which consists in varying the strength of the field in inverse proportion to the variations in armature speed by the inductive influence of a neutralizing-coil energized by an auxiliary current independent of the main current and generated in and by the field the strength of which it varies, substantially as described.

3. The herein-described method of regulating dynamo-electric machines to produce a current of substantially-uniform electromotive force at varying speeds, which consists in weakening the field in proportion to and to compensate for the excess of speed, by the inductive influence of a neutralizing-current, and preserving the polarity of the field when thus weakened to an extreme degree, by passing a current adjacent said field so as to maintain fixed polarity therein by induction, said current being independent of the current by which the main field-coils are energized, substantially as described.

4. The herein-described method of regulating dynamo-electric machines having a magnetic shunt, to produce a current of substantially-uniform electromotive force, which consists in varying the strength of the field in inverse proportion to the variations of the armature speed, by the inductive influence, on said magnetic shunt, of a neutralizing-current distinct from both the field and main currents, substantially as described.

In testimony whereof I have signed my name to this specification in the presence of two subscribing witnesses.

JOHN D. SPENCE.

Witnesses:
   GEO. H. MAXWELL,
   C. L. COTTON.